Figure 1:
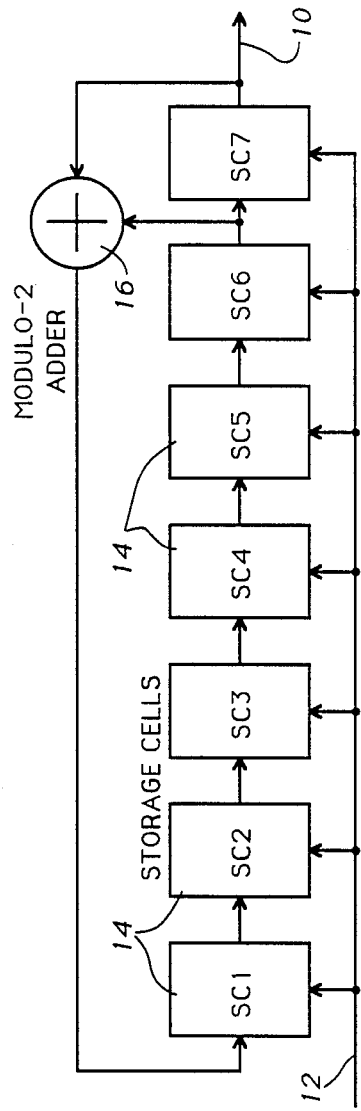

United States Patent [19]
Dilley

[11] Patent Number: 4,965,881
[45] Date of Patent: Oct. 23, 1990

[54] LINEAR FEEDBACK SHIFT REGISTERS FOR DATA SCRAMBLING

[75] Inventor: James E. Dilley, Kanata, Canada

[73] Assignee: Northern Telecom Limited, Montreal, Canada

[21] Appl. No.: 403,979

[22] Filed: Sep. 7, 1989

[51] Int. Cl.$^5$ .................... H04L 9/00; G11C 19/00
[52] U.S. Cl. ................................. 380/50; 364/717; 377/72; 380/46
[58] Field of Search ............... 380/44, 46, 49, 50; 377/72; 364/717

[56] References Cited

U.S. PATENT DOCUMENTS

| | | | |
|---|---|---|---|
| 3,691,472 | 9/1972 | Bohman | 380/50 |
| 3,784,743 | 1/1974 | Schroeder | 380/50 |
| 3,931,473 | 1/1976 | Ferris, Jr. | |
| 4,202,717 | 5/1980 | Davida et al. | 364/717 X |
| 4,771,458 | 9/1988 | Citta et al. | 380/20 |

OTHER PUBLICATIONS

Article entitled "Series-parallel Generation of m-sequences" by John J. O'Reilly, The Radio and Electronic Engineer, vol. 45, No. 4, pp. 171-176, Apr. 1975.

Primary Examiner—Thomas H. Tarcza
Assistant Examiner—Linda J. Wallace
Attorney, Agent, or Firm—Dallas F. Smith; R. John Haley

[57] ABSTRACT

A linear feedback shift register for use as a SONET data scrambler, operating in accordance with a generating polynomial of order n corresponding to an n by n transition matrix T, comprises k storage cells, where $k > n$, for producing a k-bit word, and linear feedback interconnections specified by a k by k transition matrix which is the k-th power of a k by k transition matrix constituted by the matrix T extended by k-n additional rows and columns. Specific examples are described for $k = 8$ and $k = 16$.

14 Claims, 3 Drawing Sheets

LINEAR FEEDBACK SHIFT REGISTERS FOR DATA SCRAMBLING

This invention relates to linear feedback shift registers, and is particularly concerned with such shift registers for use in data scrambling techniques.

It is well known to scramble data for transmission via a communications path, for example to facilitate clock recovery and to provide an even power-frequency distribution. In one known form of scrambling arrangement, identical scrambler and descrambler circuits are used, at the data transmitter and receiver respectively, to scramble and descramble the data, these circuits being reset by a synchronizing signal, conveniently a time division multiplex frame word, which is not scrambled. Such an arrangement is described for example in Ferris, Jr. U.S. Pat. No. 3,931,473 issued Jan. 6, 1976 and entitled "Digital Multiplexer System".

Such a scrambler circuit (as the descrambler circuit is identical, only the scrambler circuit is discussed in the following description) uses a pseudo-random sequence (PRS) generator, which in the above patent is constituted by a linear feedback shift register (LFSR) having 11 storage cells and generating a PRS which repeats itself after 2047, or $2^{11}-1$, clock cycles, this being referred to as the sequence length. Considered more generally, for a maximum sequence length $m=2^n-1$, an LFSR having n storage cells or shift register stages can be used, with appropriate combination logic feedback elements for operation in accordance with a desired PRS generating polynomial of order n.

In a paper entitled "Series-parallel generation of m-sequences" by John J. O'Reilly, The Radio and Electronic Engineer, Vol. 45, No. 4, pages 171–176, April 1975 there is described a class of LFSRs for use as pseudo-random word generators (PRWGs), together with a description of the manner in which the combination logic feedback elements can be determined, for generating pseudo-random words each of k bits, where $k \leq n$. Such series-parallel PRWGs provide the advantage that they can be operated at a clock rate equal to the data bit rate divided by k; for data bit rates of the order of 600 Mb/s (megabits per second) or more which are increasingly being used in optical fiber transmission systems, this advantage is significant in terms of reduced power consumption and circuit design (e.g. using CMOS rather than ECL circuitry), if the value of k is sufficiently large. The series-parallel PRWG produces k-bit words which, after serialization in a k:1 parallel-to-serial converter, result in a bit sequence which is identical to that which would be obtained from an n-bit serial shift register with feedback taps defined by the same generating polynomial of order n.

The SONET (synchronous optical network) standard requires the use of a data scrambler which is synchronized to the 125 μs SONET frame rate and operates in accordance with the generating polynomial $1+x^6+x^7$, for which the order $n=7$ and the sequence length $m=2^n-1=127$. SONET data rates are N times 51.84 Mb/s for a so-called STS-N signal, where N has a preferred value selected from the numbers 1, 3, 9, 12, 18, 24, 36, and 48. For example, an STS-12 signal has a bit rate of $12 \times 51.84 = 622.08$ Mb/s. In SONET, data words each of 8 bits are word or byte-interleaved for transmission.

Applying the known series-parallel PRWG techniques to a SONET data signal, with the required values of $n=7$, $m=127$, and $k \leq n$, the maximum value of k is 7. In view of the 8-bit byte interleaving of SONET data, a value of $k=7$ is inconvenient and impractical because there is no integral relationship between this value and the 8 bits of each data byte. In order to provide such an integral relationship a value of k TM 4 can be used, providing a 4:1 reduction in clock rate of the PRWG. The PRWG clock rate for an STS-12 signal then becomes $622.08/4 = 155.52$ MHz. A PRWG operating at this speed can not be produced using current CMOS design techniques but must use ECL (emitter-coupled logic) BICMOS, or GaAs technology, with consequent disadvantages with respect to circuit design and integration and power dissipation.

Accordingly, it would be desirable to provide a PRWG in which $k>n$, for example in which n TM 7 as required for SONET and in which k is greater then 7 and is selected to provide an integral relationship with respect to the 8 bits of each data byte, for example $k=8$ or some integral multiple of 8. For example, with $k=16$ the PRWG clock rate for an STS-12 signal becomes $622.08/16 = 38.88$ MHz; a PRWG operating at such a speed can be conveniently provided in a CMOS integrated circuit.

An object of this invention, therefore, is to provide an improved linear feedback shift register which can be used as such a PRWG.

According to one aspect this invention provides a linear feedback shift register for operation in accordance with a generating polynomial of order n corresponding to an n by n transition matrix T, the shift register comprising: k storage cells, where k and n are integers and $k>n$; means for supplying a clock signal simultaneously to all of the storage cells; means for deriving a k-bit word from outputs of the storage cells; and linear feedback means coupling inputs of the storage cells to respective outputs of the storage cells in accordance with a k by k transition matrix T', each row and column of the transition matrix T' corresponding to a storage cell, binary 1's in each row of the transition matrix T' indicating that that row's storage cell's input is responsive to a storage cell's output as represented by the column in which the binary 1's appear; where the matrix T' is the k-th power of a k by k matrix T' consisting of the n by n matrix T extended by an additional k-n rows and columns, with each of the additional rows $n+1$ to k representing a connection of an input of a respective storage cell to the output of the storage cell corresponding to the preceding row of the matrix.

The integer k is preferably an integral multiple of 8, for example 8 or 16. For SONET data applications, $n=7$ and the generating polynomial is $1+x^6+x^7$.

According to another aspect this invention provides a linear feedback shift register comprising k storage cells, for producing a k-bit word, and linear feedback means interconnecting said storage cells in accordance with a transition matrix which is the k-th power of a k by k transition matrix:

$$\begin{vmatrix} & 0 & . & . & 0 \\ T & & . & & . \\ & & . & & . \\ 0 & ... & 0 & 1 & 0 & .. & 0 \\ . & & . & . & . & & . \\ 0 & ... & 0 & .. & 0 & 1 & 0 \end{vmatrix}$$

each row and column of the transition matrix corresponding to a storage cell, binary 1's in each row of the transition matrix indicating that that row's storage cell's input is responsive to a storage cell's output as represented by the column in which the binary 1'appear; where T is an n by n transition matrix corresponding to a generating polynomial of order n of the shift register, k and n are integers, and k>n.

In one embodiment, the invention provides a linear feedback shift register comprising 8 storage cells and linear feedback means interconnecting said storage cells in accordance with a transition matrix:

$$\begin{vmatrix} 0 & 0 & 0 & 0 & 1 & 0 & 1 & 0 \\ 1 & 0 & 0 & 0 & 0 & 1 & 1 & 0 \\ 1 & 1 & 0 & 0 & 0 & 0 & 0 & 0 \\ 0 & 1 & 1 & 0 & 0 & 0 & 0 & 0 \\ 0 & 0 & 1 & 1 & 0 & 0 & 0 & 0 \\ 0 & 0 & 0 & 1 & 1 & 0 & 0 & 0 \\ 0 & 0 & 0 & 0 & 1 & 1 & 0 & 0 \\ 0 & 0 & 0 & 0 & 0 & 1 & 1 & 0 \end{vmatrix}$$

In another embodiment, the invention provides a linear feedback shift register comprising 16 storage cells and linear feedback means interconnecting said storage cells in accordance with a transition matrix:

$$\begin{vmatrix} 0 & 0 & 1 & 1 & 1 & 1 & 0 & 0 & 0 & 0 & 0 & 0 & 0 & 0 & 0 & 0 \\ 0 & 0 & 0 & 1 & 1 & 1 & 1 & 0 & 0 & 0 & 0 & 0 & 0 & 0 & 0 & 0 \\ 1 & 0 & 0 & 0 & 1 & 1 & 0 & 0 & 0 & 0 & 0 & 0 & 0 & 0 & 0 & 0 \\ 0 & 1 & 0 & 0 & 0 & 1 & 1 & 0 & 0 & 0 & 0 & 0 & 0 & 0 & 0 & 0 \\ 1 & 0 & 1 & 0 & 0 & 0 & 0 & 0 & 0 & 0 & 0 & 0 & 0 & 0 & 0 & 0 \\ 0 & 1 & 0 & 1 & 0 & 0 & 0 & 0 & 0 & 0 & 0 & 0 & 0 & 0 & 0 & 0 \\ 0 & 0 & 1 & 0 & 1 & 0 & 0 & 0 & 0 & 0 & 0 & 0 & 0 & 0 & 0 & 0 \\ 0 & 0 & 0 & 1 & 0 & 1 & 0 & 0 & 0 & 0 & 0 & 0 & 0 & 0 & 0 & 0 \\ 0 & 0 & 0 & 0 & 1 & 0 & 1 & 0 & 0 & 0 & 0 & 0 & 0 & 0 & 0 & 0 \\ 1 & 0 & 0 & 0 & 0 & 1 & 1 & 0 & 0 & 0 & 0 & 0 & 0 & 0 & 0 & 0 \\ 1 & 1 & 0 & 0 & 0 & 0 & 0 & 0 & 0 & 0 & 0 & 0 & 0 & 0 & 0 & 0 \\ 0 & 1 & 1 & 0 & 0 & 0 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 & 0 & 0 & 0 & 0 \\ 0 & 0 & 0 & 1 & 1 & 0 & 0 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 & 0 \\ 0 & 0 & 0 & 0 & 0 & 1 & 1 & 0 & 0 & 0 & 0 & 0 & 0 & 0 & 0 & 0 \end{vmatrix}$$

Figure 2:
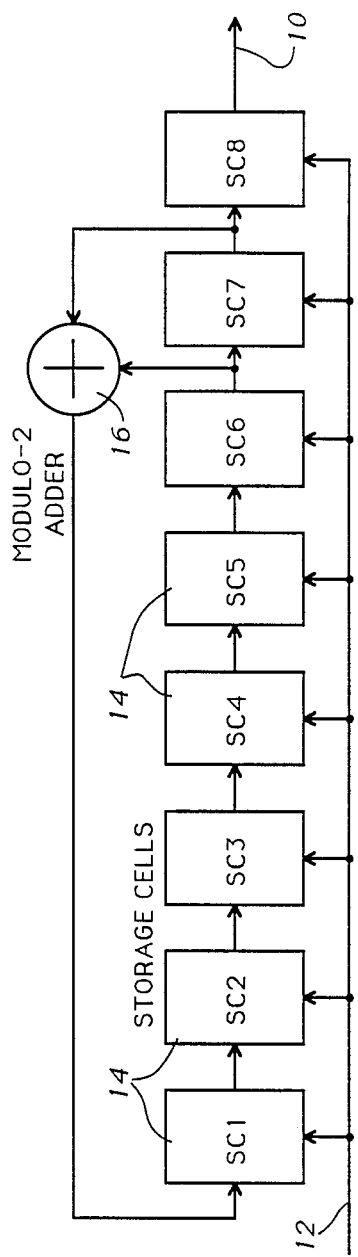

The invention will be further understood from the following description with reference to the accompanying drawings, in which:

FIG. 1 schematically illustrates a known form of serial LFSR (linear feedback shift register);

FIG. 2 schematically illustrates a modified form of serial

Figure 3:
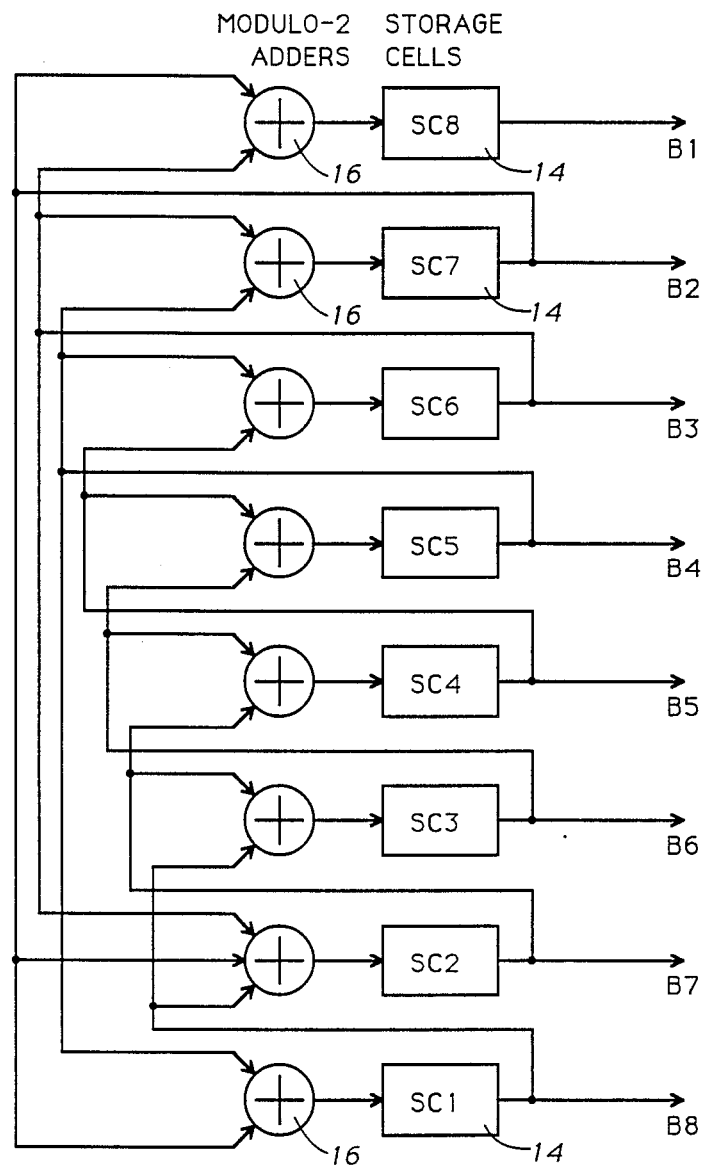
Figure 4:
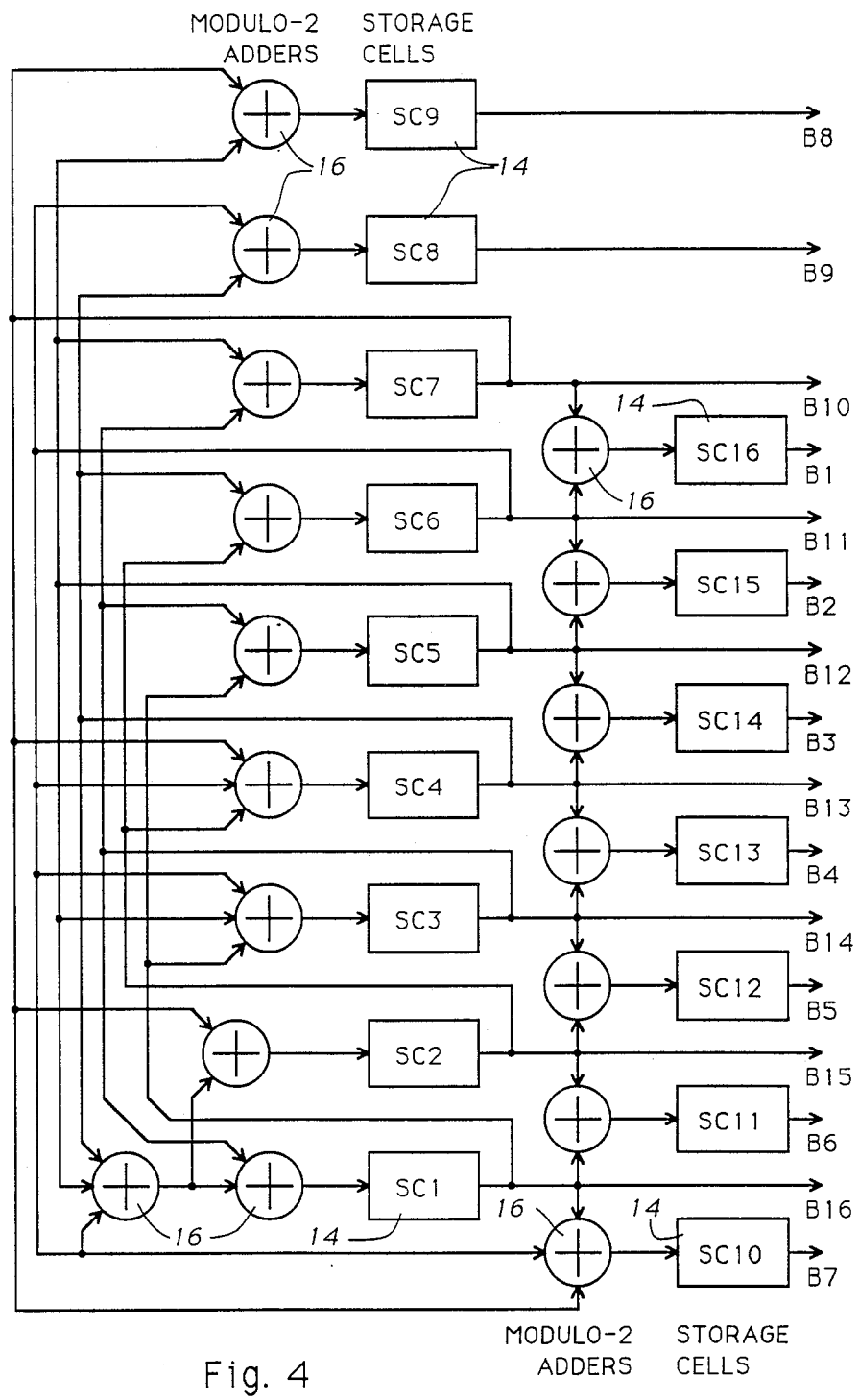

FIG. 3 schematically illustrates an 8-bit parallel LFSR in accordance with an embodiment of this invention; and FIG. 4 schematically illustrates a 16-bit parallel LFSR in accordance with an embodiment of this invention.

Referring to FIG. 1, there is illustrated a 7-stage serial LFSR for generating on an output line 10 a serial pseudo-random bit sequence in accordance with a generating polynomial $1+x^6+x^7$ of order n=7, at a bit rate equal to the rate of a clock signal supplied via a line 12. To this end the shift register comprises 7 serially coupled shift register stages or storage cells 14, numbered SC1 to SC7, each of which is clocked by the clock signal on the line 12 and can be constituted by a flip-flop. The output line 10 is connected to the output of the last cell SC7. In accordance with the generating polynomial $1+x^6+x^7$ the outputs of the cell SC6 and SC7 are combined in a modulo-2 adder 16, which can be constituted by an Exclusive-OR gate, whose output is connected to the input of the first cell SC1.

In such a LFSR, the pseudo-random bit sequence is produced on the output line 10 serially at the same rate as the clock signal on the line 12. For such a LFSR used in a data scrambler of a transmission system, this is the same as the data transmission rate. Accordingly, the storage cells 14 must be operable at the data transmission rate.

As described in the O'Reilly paper already referred to, such a LFSR can be specified in terms of an n by n transition matrix T. In such a matrix each row defines the excitation of a corresponding one of the n storage cells of the LFSR, each row having a binary 1 indicating those cells which provide an output to this respective storage cell. Thus for the LFSR of FIG. 1, the transition matrix T1 is:

$$T1 = \begin{vmatrix} 0 & 0 & 0 & 0 & 0 & 1 & 1 \\ 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \end{vmatrix} \begin{array}{l} (SC1 \text{ receives input from } SC6 \text{ \& } SC7^*) \\ (SC2 \text{ receives input from } SC1) \\ (SC3 \text{ receives input from } SC2) \\ (SC4 \text{ receives input from } SC3) \\ (SC5 \text{ receives input from } SC4) \\ (SC6 \text{ receives input from } SC5) \\ (SC7 \text{ receives input from } SC6) \end{array}$$

(*modulo-2 addition).

As also described in the O'Reilly paper, a k-bit wide series-parallel generator with n storage cells (ksn) can be specified by the k-th power of such a transition matrix, enabling the LFSR to be operated at the data transmission rate divided by k. However, the O'Reilly paper does not consider in any way the case of k<n, with which this invention is concerned.

For the case of k<n; in accordance with this invention the number of storage cells in the LFSR is increased to k, without changing the generating polynomial, order n, or the sequence length $m = 2^n - 1$ of the generated pseudo-random sequence. (This is in distinct contrast to the O'Reilly paper, in which n represents both the number of storage elements and the order of the characteristic equation.) For example, FIG. 2 shows in a manner similar to FIG. 1 a LFSR for which the generating polynomial is $1 = x^6 = x^7$, n=7, and $m = 2^7 - 1 = 127$, as in FIG. 1, but in which there are k=8 storage cells 14 numbered SC1 to SC8. This is the same as the LFSR of FIG. 1, except that an additional storage cell SC8 is added between the storage cell SC7 and the output line 10. The transition matrix T2 for the LFSR of FIG. 2 is:

$$T2 = \begin{vmatrix} 0&0&0&0&0&1&1&0 \\ 1&0&0&0&0&0&0&0 \\ 0&1&0&0&0&0&0&0 \\ 0&0&1&0&0&0&0&0 \\ 0&0&0&1&0&0&0&0 \\ 0&0&0&0&1&0&0&0 \\ 0&0&0&0&0&1&0&0 \\ 0&0&0&0&0&0&1&0 \end{vmatrix}.$$

It should be noted that this is a k by k matrix (k=8), not an n by n matrix (n=7) as in the O'Reilly paper, but is still of order n (i.e. $m=1^n-1$). This matrix T2 is constituted by the matrix T1 extended by $k-n=1$ additional row and column, the additional row containing a 1 in column 7 to indicate that the input of the eighth storage cell represented by this row is coupled to the output of the storage cell SC7, i.e. the immediately preceding shift register storage cell.

Although as shown in FIG. 2 the LFSR produces a serial output on the line 10, the k-th power of its transition matrix T2 can be taken to specify the arrangement of an 8-stage LFSR providing a k-bit parallel output. Thus for the case of k=8 the transition matrix $T_3$ is:

$$T3 = T2^8 = \begin{vmatrix} 0&0&0&0&1&0&1&0 \\ 1&0&0&0&0&1&1&0 \\ 1&1&0&0&0&0&0&0 \\ 0&1&1&0&0&0&0&0 \\ 0&0&1&1&0&0&0&0 \\ 0&0&0&1&1&0&0&0 \\ 0&0&0&0&1&1&0&0 \\ 0&0&0&0&0&1&1&0 \end{vmatrix}.$$

This transition matrix T3 is arrived at simply by taking the 8-th power of the matrix T2, using standard rules for matrix multiplication and using modulo-2 addition throughout. It fully specifies the arrangement of a LFSR with k=8 storage cells, providing a k=8-bit parallel data output, one bit from each storage cell, with order n=7, sequence length $m=2^{-1}=127$, and generating polynomial $1+x^6+x^7$. Such a LFSR is illustrated in FIG. 3.

Referring to FIG. 3, the LFSR illustrated therein comprises the eight storage cells 14, numbered SC1 to SC8, whose outputs provide the 8 bits BB to B1 respectively of an 8-bit word which is generated in a pseudorandom sequence. The LFSR further comprises eight modulo-2 2 adders 16, each having an output connected to an input of a respective one of the storage cells and having inputs specified by the binary 1s in a respective row of the above transition matrix T3. Thus for example in the first row of the transition matrix T3, corresponding to the storage cell SC1, there is a 1 in each of columns 5 and 7, so that in FIG. 3 the modulo-2 adder 16 whose output is connected to the input of the storage cell SC1 has its inputs connected to the outputs of the storage cells SC5 and SC7. The other connections in FIG. 3 are arrived at similarly.

In FIG. 3, and likewise in FIG. 4 described below, for simplicity the clock signal line 12 is not shown, but is connected as in FIGS. 1 and 2 to a clock input of each storage cell 14, which can be constituted by a flip-flop.

Each two-input modulo-2 adder can be constituted by a two-input Exclusive-OR gate, and each three-input modulo-2 adder can be constituted by a three-input Exclusive-OR gate or by two two-input Exclusive-OR gates with the output of one connected to one input of the other, in known manner.

The LFSR of FIG. 3 operates in accordance with the SONET generating polynomial $1+x^6+x^7$ as described above, with order n=7 and sequence length $m=2^n-1=127$, and produces a k=8-bit output word. Accordingly, it can be used readily in a SONET scrambler or descrambler with a clock rate equal to the SONET data rate divided by k=8. For example, for an STS-12 signal with a bit rate of 622.08 Mb/s, the LFSR of FIG. 3 is operated with a clock signal frequency of 622.08/8=77.76 MHz.

The invention is equally applicable to other values of k<n, in a similar manner. As integral multiples of b 8 are desirable for compatibility with the 8- bit byte in the SONET standard, the following description with reference to FIG. 4 relates to the case of k=16, i.e. generation of a 16-bit word at a rate one sixteenth of the data rate.

As in the above description, the n by n transition matrix T1 above is expanded to a k by k transition matrix T4:

$$T4 = \begin{vmatrix} 0&0&0&0&0&1&1&0&0&0&0&0&0&0&0&0 \\ 1&0&0&0&0&0&0&0&0&0&0&0&0&0&0&0 \\ 0&1&0&0&0&0&0&0&0&0&0&0&0&0&0&0 \\ 0&0&1&0&0&0&0&0&0&0&0&0&0&0&0&0 \\ 0&0&0&1&0&0&0&0&0&0&0&0&0&0&0&0 \\ 0&0&0&0&1&0&0&0&0&0&0&0&0&0&0&0 \\ 0&0&0&0&0&1&0&0&0&0&0&0&0&0&0&0 \\ 0&0&0&0&0&0&1&0&0&0&0&0&0&0&0&0 \\ 0&0&0&0&0&0&0&1&0&0&0&0&0&0&0&0 \\ 0&0&0&0&0&0&0&0&1&0&0&0&0&0&0&0 \\ 0&0&0&0&0&0&0&0&0&1&0&0&0&0&0&0 \\ 0&0&0&0&0&0&0&0&0&0&1&0&0&0&0&0 \\ 0&0&0&0&0&0&0&0&0&0&0&1&0&0&0&0 \\ 0&0&0&0&0&0&0&0&0&0&0&0&1&0&0&0 \\ 0&0&0&0&0&0&0&0&0&0&0&0&0&1&0&0 \\ 0&0&0&0&0&0&0&0&0&0&0&0&0&0&1&0 \end{vmatrix}$$

and the k-th power of this is determined (using standard matrix rules and modulo-2 addition) to produce a transition matrix T5 which fully specifies the arrangement of the desired LFSR with k=16 storage cells:

$$T5 = T4^{16} = \begin{vmatrix} 0&0&1&1&1&1&0&0&0&0&0&0&0&0&0&0 \\ 0&0&0&1&1&1&1&0&0&0&0&0&0&0&0&0 \\ 1&0&0&0&1&1&0&0&0&0&0&0&0&0&0&0 \\ 0&1&0&0&0&1&1&0&0&0&0&0&0&0&0&0 \\ 1&0&1&0&0&0&0&0&0&0&0&0&0&0&0&0 \\ 0&1&0&1&0&0&0&0&0&0&0&0&0&0&0&0 \\ 0&0&1&0&1&0&0&0&0&0&0&0&0&0&0&0 \\ 0&0&0&1&0&1&0&0&0&0&0&0&0&0&0&0 \end{vmatrix}$$

$$\begin{vmatrix} 0&0&0&0&1&0&1&0&0&0&0&0&0&0&0&0 \\ 1&0&0&0&0&1&1&0&0&0&0&0&0&0&0&0 \\ 1&1&0&0&0&0&0&0&0&0&0&0&0&0&0&0 \\ 0&1&1&0&0&0&0&0&0&0&0&0&0&0&0&0 \\ 0&0&1&1&0&0&0&0&0&0&0&0&0&0&0&0 \\ 0&0&0&1&1&0&0&0&0&0&0&0&0&0&0&0 \\ 0&0&0&0&1&1&0&0&0&0&0&0&0&0&0&0 \\ 0&0&0&0&0&1&1&0&0&0&0&0&0&0&0&0 \end{vmatrix}.$$

FIG. 4 illustrates one possible form of the resulting LFSR, which comprises k=16 storage cells 14 numbered SC1 to SC16, whose outputs produce bits B16 to B1 respectively of a k=16-bit output word, and associated modulo-2 adders 16 whose input connections are specified by the above transition matrix T5. For example, in the first row of the transition matrix T5, corresponding to the storage cell SC1 in FIG. 4, there is a 1 in each of columns 3 to 6, so that in FIG. 4 the storage cell SC1 receives via modulo-2 adders 16 a modulo-2 addition of the outputs of the storage cells SC3 to SC6.

For example for scrambling and descrambling SONET STS-12 data at a bit rate of 622.08 Mb/s, the LFSR of FIG. 4 can be used with a clock signal at a frequency of 622.08/16=38.88 MHz. For operation at such a clock rate, the LFSR of FIG. 4 can be easily produced in a CMOS integrated circuit having low power dissipation.

Although particular embodiments of the invention have been described in detail, the invention is not limited thereto but it is generally applicable to LFSRs with different values of n and m, different generating polynomials, and arbitrary values of k>n. Accordingly, numerous modifications, variations, and adaptations may be made to the embodiments of the invention described above without departing from the scope of the invention as defined in the claims.

What is claimed is:

1. A linear feedback shift register for operation in accordance with a generating polynomial of order n corresponding to an n by n transition matrix T, the shift register comprising:
   k storage cells, where k and n are integers and k>n;
   means for supplying a clock signal simultaneously to all of the storage cells;
   means for deriving a k-bit word from outputs of the storage cells; and
   linear feedback means coupling inputs of the storage cells to respective outputs of the storage cells in accordance with a k by k transition matrix T', each row and column of the transition matrix T' corresponding to a storage cell, binary 1's in each row of the transition matrix T' indicating that that row's storage cell's input is responsive to a storage cell's output as represented by the column in which the binary 1's appear;
   where the matrix T' is the k-th power of a k by k matrix T'' consisting of the n by n matrix T extended by an additional k-n rows and columns, with each of the additional rows n+1 to k representing a further connection of an input of a respective storage cell to the output of the storage cell corresponding to the preceding row of the matrix.

2. A linear feedback shift register as claimed in claim 1 wherein k is an integral multiple of 8.

3. A linear feedback shift register as claimed in claim 1 wherein the linear feedback means comprises modulo-2 adders.

4. A linear feedback shift register as claimed in claim 1 wherein n=7.

5. A linear feedback shift register as claimed in claim 4 wherein the generating polynomial is $1+x^6+x^7$.

6. A linear feedback shift register as claimed in claim 5 wherein k is an integral multiple of 8.

7. A linear feedback shift register as claimed in claim 5 wherein k=8.

8. A linear feedback shift register as claimed in claim 5 wherein k=16.

9. A linear feedback shift register comprising k storage cells, for producing a k-bit word, and linear feedback means interconnecting said storage cells in accordance with a transition matrix which is the k-th power of a k by k transition matrix:

$$\begin{matrix} & & & 0 & . & . & 0 \\ T & & & . & & & . \\ & & & . & & & . \\ & & & . & & & . \\ 0 & \ldots & 0 & 1 & 0 & . & . & 0 \\ . & & & . & . & . & & . \\ . & & & . & & . & . & . \\ 0 & \ldots & 0 & . & . & 0 & 1 & 0, \end{matrix}$$

each row and column of the transition matrix corresponding to a storage cell, binary 1's in each row of the transition matrix indicating that that row's storage cell's input is responsive to a storage cell's output as represented by the column in which the binary 1's appear;
   where T is an n by n transition matrix corresponding to a generating polynomial of order n of the shift register, k and n are integers, and k>n.

10. A linear feedback shift register as claimed in claim 9 wherein n=7 and the generating polynomial is $1+x^6+x^7$.

11. A linear feedback shift register as claimed in claim 10 wherein k=8.

12. A linear feedback shift register as claimed in claim 10 wherein k=16.

13. A linear feedback shift register as claimed in claim 1 wherein k is 8 and the linear feedback means interconnects said storage cells in accordance with a transition matrix:

```
0 0 0 0 1 0 1 0
1 0 0 0 0 1 1 0
1 1 0 0 0 0 0 0
0 1 1 0 0 0 0 0
0 0 1 1 0 0 0 0
0 0 0 1 1 0 0 0
0 0 0 0 1 1 0 0
0 0 0 0 0 1 1 0.
```

14. A linear feedback shift register as claimed in claim 1 wherein k is 16 and the linear feedback means interconnects said storage cells in accordance with a transition matrix:

```
0 0 0 0 0 0 0 0.
```

* * * * *

UNITED STATES PATENT AND TRADEMARK OFFICE
CERTIFICATE OF CORRECTION

PATENT NO : 4,965,881
DATED : Oct. 23, 1990
INVENTOR(S) : James E. Dilley

It is certified that error appears in the above-identified patent and that said Letters Patent is hereby corrected as shown below:

Cover Page, under References Cited, "4,202,717" should be --4,202,051--.

Column 2, lines 7 and 19, "TM" should be --=--;  line 52, "T'" should be --T"--;
line 55, --further-- should be inserted before "connection".

Column 3, line 17, "1'appear;" should be --1's appear;--;  line 51, vertical matrix lines should be joined;  line 68, --LFSR;-- should be inserted after "serial".

Column 4, line 18, --,-- should be inserted after "$x^7$"; "cell" should be --cells--;
line 50, "(ksn)" should be --(k≤n)--;  lines 54 and 56, "k<n" should be --k>n--;
line 65, "$1=x^6=x^7$" should be --$1+x^6+x^7$--.

Column 5, line 17, "$m=1^n-1$" should be --$m=2^n-1$--;  line 28, "$T_3$" should be --$T3$--;
line 46, "$m=2^{-1}=127$" should be --$m=2^n-1=127$--;  line 51, "BB" should be --B8--;  line 54, after "modulo-2", "2" should be deleted.

Column 6, line 22, "k<n" should be --k>n--; "b" should be deleted;
line 43, vertical matrix lines should be joined;

Column 8, lines 21 to 30 should be:    lines 53 to 61 should be:

$$T \begin{vmatrix} & & 0 & . & . & 0 \\ & & & . & & . \\ & & & & . & . \\ 0 & ... & 0 & 1 & 0 & . & . & 0 \\ . & . & . & . & . & . \\ . & . & . & . & . & . \\ 0 & ... & 0 & . & . & 0 & 1 & 0 \end{vmatrix},$$

$$\begin{vmatrix} 0 & 0 & 0 & 0 & 1 & 0 & 1 & 0 \\ 1 & 0 & 0 & 0 & 0 & 1 & 1 & 0 \\ 1 & 1 & 0 & 0 & 0 & 0 & 0 & 0 \\ 0 & 1 & 1 & 0 & 0 & 0 & 0 & 0 \\ 0 & 0 & 1 & 1 & 0 & 0 & 0 & 0 \\ 0 & 0 & 0 & 1 & 1 & 0 & 0 & 0 \\ 0 & 0 & 0 & 0 & 1 & 1 & 0 & 0 \\ 0 & 0 & 0 & 0 & 0 & 1 & 1 & 0 \end{vmatrix}.$$

UNITED STATES PATENT AND TRADEMARK OFFICE
CERTIFICATE OF CORRECTION

PATENT NO : 4,965,881
DATED : Oct. 23, 1990
INVENTOR(S) : James E. Dilley

Page 2 of 2

It is certified that error appears in the above-identified patent and that said Letters Patent is hereby corrected as shown below:

Column 8, line 67, "0 0 0 0 0 0 0 0." should be deleted and replaced by:

$$\begin{vmatrix} 0&0&1&1&1&1&0&0&0&0&0&0&0&0 \\ 0&0&0&1&1&1&1&0&0&0&0&0&0&0 \\ 1&0&0&0&1&1&0&0&0&0&0&0&0&0 \\ 0&1&0&0&0&1&1&0&0&0&0&0&0&0 \\ 1&0&1&0&0&0&0&0&0&0&0&0&0&0 \\ 0&1&0&1&0&0&0&0&0&0&0&0&0&0 \\ 0&0&1&0&1&0&0&0&0&0&0&0&0&0 \\ 0&0&0&1&0&1&0&0&0&0&0&0&0&0 \\ 0&0&0&0&1&0&1&0&0&0&0&0&0&0 \\ 1&0&0&0&0&1&1&0&0&0&0&0&0&0 \\ 1&1&0&0&0&0&0&0&0&0&0&0&0&0 \\ 0&1&1&0&0&0&0&0&0&0&0&0&0&0 \\ 0&0&1&1&0&0&0&0&0&0&0&0&0&0 \\ 0&0&0&1&1&0&0&0&0&0&0&0&0&0 \\ 0&0&0&0&1&1&0&0&0&0&0&0&0&0 \\ 0&0&0&0&0&1&1&0&0&0&0&0&0&0 \end{vmatrix}.$$

Signed and Sealed this

Twelfth Day of May, 1998

Attest:

BRUCE LEHMAN

*Attesting Officer*          *Commissioner of Patents and Trademarks*